Jan. 28, 1958 J. C. MENDES 2,821,384

SHEET COLLATOR

Filed Aug. 4, 1953 13 Sheets-Sheet 1

INVENTOR.
John Curry Mendes
BY Wright, Brown, Quinby & May
Attys.

Jan. 28, 1958 J. C. MENDES 2,821,384

SHEET COLLATOR

Filed Aug. 4, 1953 13 Sheets-Sheet 2

INVENTOR.
John Curry Mendes
BY Wright, Brown, Quinby & May Attys.

Jan. 28, 1958 J. C. MENDES 2,821,384

SHEET COLLATOR

Filed Aug. 4, 1953 13 Sheets-Sheet 3

INVENTOR.
John Curry Mendes
BY Wright, Brown, Quinby & May
Attys.

Jan. 28, 1958 J. C. MENDES 2,821,384

SHEET COLLATOR

Filed Aug. 4, 1953 13 Sheets-Sheet 4

INVENTOR.

John Curry Mendes

BY Wright, Brown, Quinby & May, Attys.

Jan. 28, 1958 J. C. MENDES 2,821,384

SHEET COLLATOR

Filed Aug. 4, 1953 13 Sheets-Sheet 5

INVENTOR.
John Curry Mendes
BY Wright, Brown, Quinby & May
Attys.

Jan. 28, 1958 J. C. MENDES 2,821,384
SHEET COLLATOR
Filed Aug. 4, 1953 13 Sheets-Sheet 6
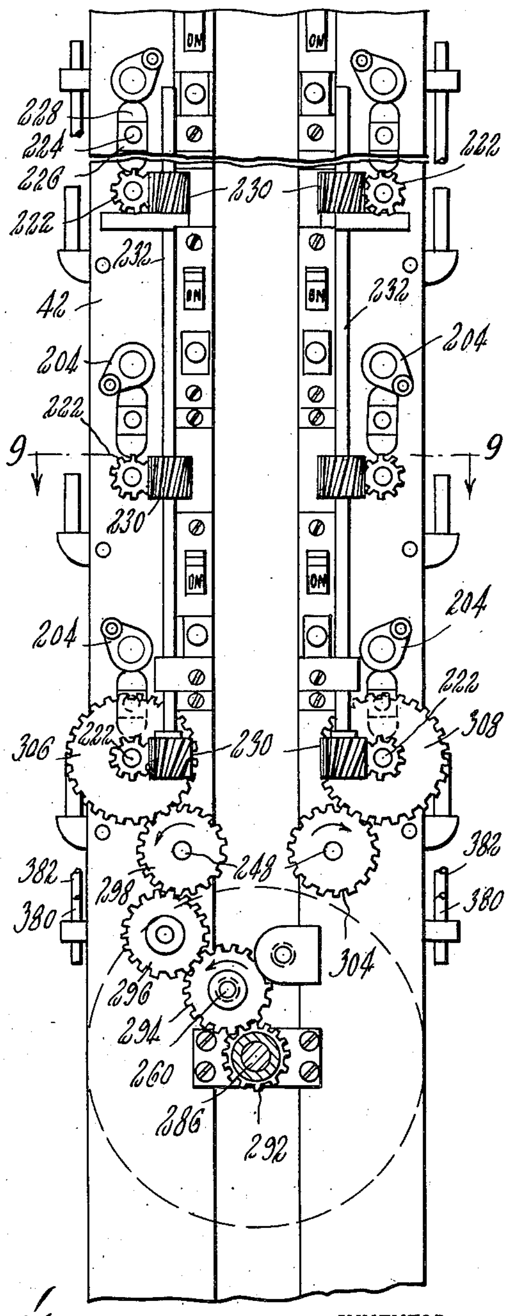
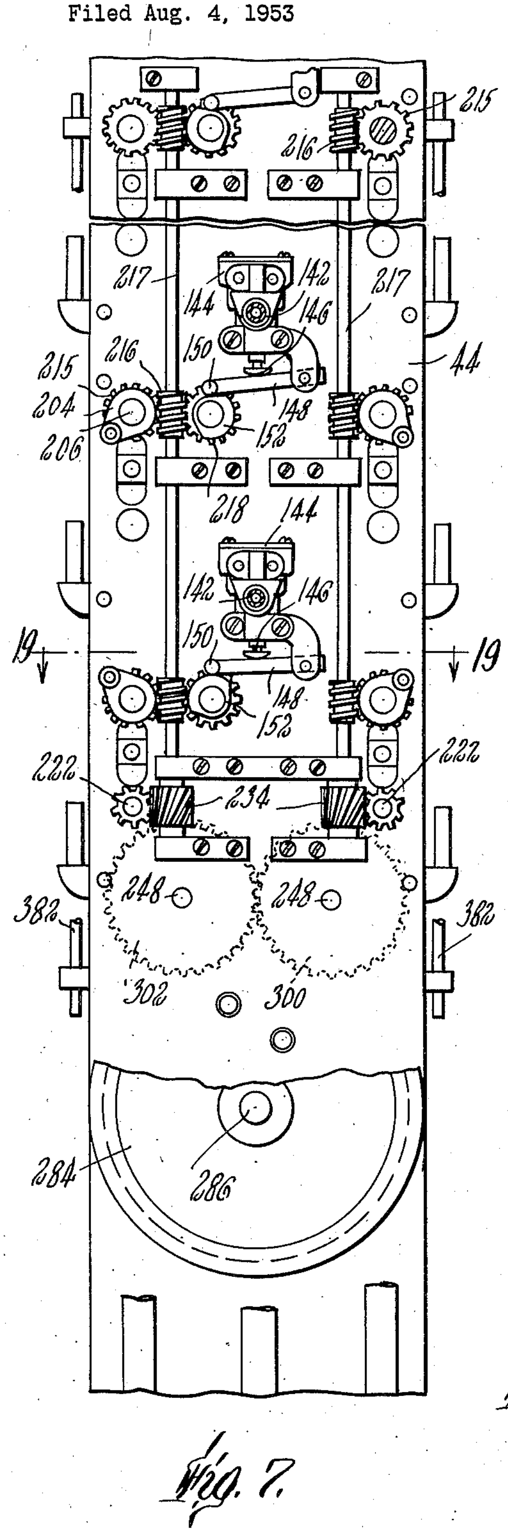
FIG. 6.
FIG. 7.
INVENTOR.
John Curry Mendes
BY Wright, Brown, Quinby & May
Attys.

Jan. 28, 1958 J. C. MENDES 2,821,384

SHEET COLLATOR

Filed Aug. 4, 1953 13 Sheets-Sheet 7

INVENTOR.

John Curry Mendes

BY Wright, Brown, Quinby & May

Attys.

Jan. 28, 1958 J. C. MENDES 2,821,384

SHEET COLLATOR

Filed Aug. 4, 1953 13 Sheets-Sheet 8

INVENTOR.
John Curry Mendes
BY Wright, Brown, Quinby & May
Attys.

INVENTOR.
John Curry Mendes
BY Wright, Brown, Quinby & May
Attys.

Jan. 28, 1958 J. C. MENDES 2,821,384

SHEET COLLATOR

Filed Aug. 4, 1953 13 Sheets-Sheet 10

INVENTOR.
John Curry Mendes
BY Wright, Brown, Quinby & May
Attys.

INVENTOR.
John Curry Mendes
BY Wright, Brown, Quinby & May
Attys.

INVENTOR.
John Curry Mendes
BY Wright, Brown, Quinby & May
Attys.

INVENTOR.
John Curry Mendes
BY Wright, Brown,
Quinby & May
Attys.

United States Patent Office 2,821,384

Patented Jan. 28, 1958

2,821,384

SHEET COLLATOR

John C. Mendes, Milton, Mass.

Application August 4, 1953, Serial No. 372,286

10 Claims. (Cl. 270—58)

This invention relates to a collator for collecting successive groups of sheets of paper from piles of the individual sheets. It is an object of the invention to provide a machine which is compact, rapid and reliable in action, and which can easily be adjusted to assemble single groups of a number of sheets up to the capacity of the machine or to assemble simultaneously two different groups of sheets.

In the embodiment of the invention illustrated on the drawings, provision is made for collating sheets from eight piles of sheets which are on shelves arranged in two tiers of four each. Single sheets are withdrawn from the piles, or some of them as desired, and are brought together and discharged as a group into a receptacle. If preferred, sheets from the two tiers can be collated in separate groups of four or less each.

The sheets withdrawn from the piles are individually calipered, and stop mechanism is provided to stop the operation of the machine if either no sheet or more than one sheet is withdrawn from a platform when the corresponding paper-lifting mechanism goes through a paper-withdrawing cycle. Signals are provided to indicate the location of any such fault so it can quickly be found and corrected.

The sheets withdrawn rom the shelves in each tier are fed into contact with downwardly moving vertical belts, the timing of the individual withdrawing means being such that each sheet reaches the belt when the sheet or sheets from above reach that level in their descent. Hence when the sheets are delivered to the receptacle below, they are in face to face contact and register approximately with one another.

For a more complete understanding of the invention reference may be had to the following description thereof and to the drawings, of which—

Figure 6 is a front elevation of the supporting frame, showing drive means;

Figure 7 is a rear elevation of the supporting frame showing drive means;

Figure 1:
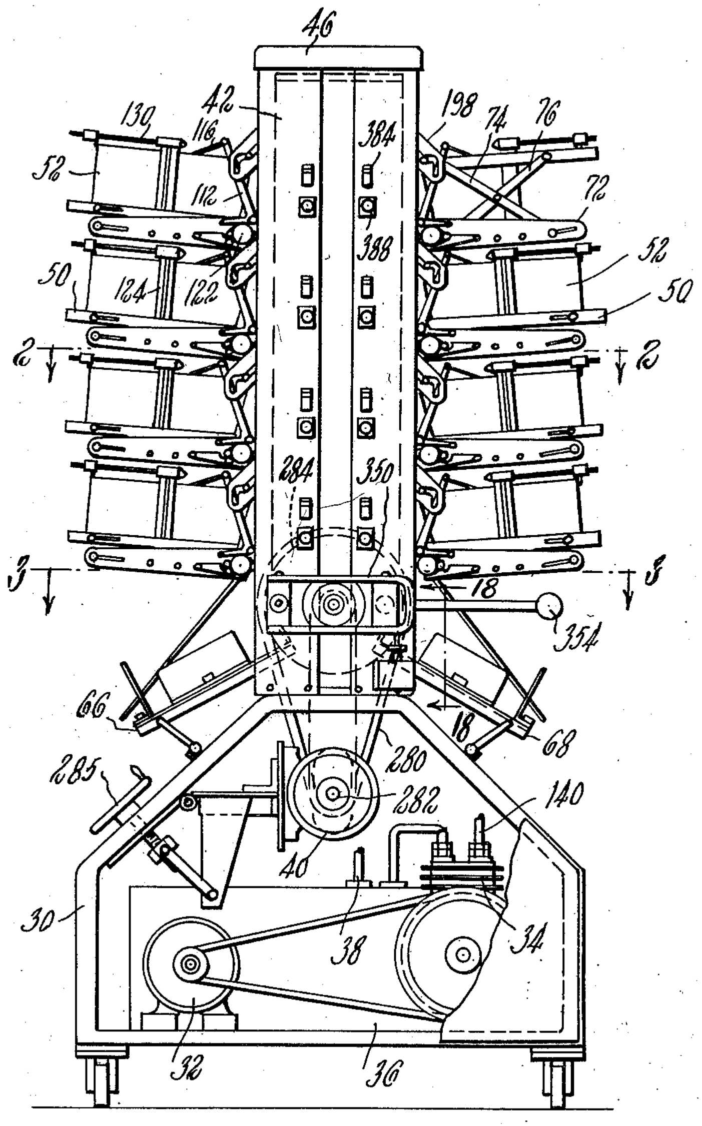
Figure 1 is a front elevation of a machine embodying the invention.
Figure 8:
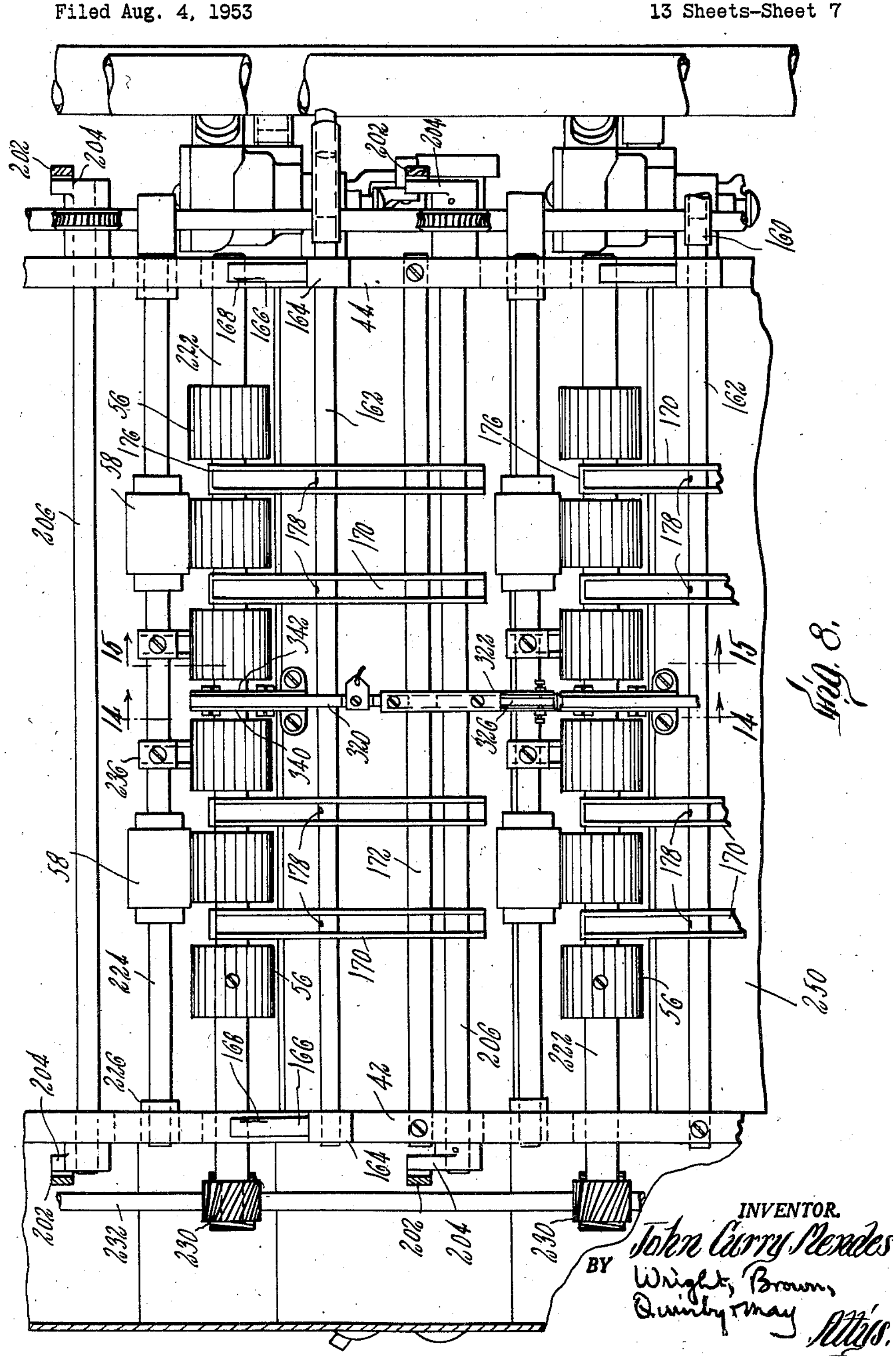
Figure 8 is a section on the line 8—8 of Figure 4, on a larger scale.
Figure 9:
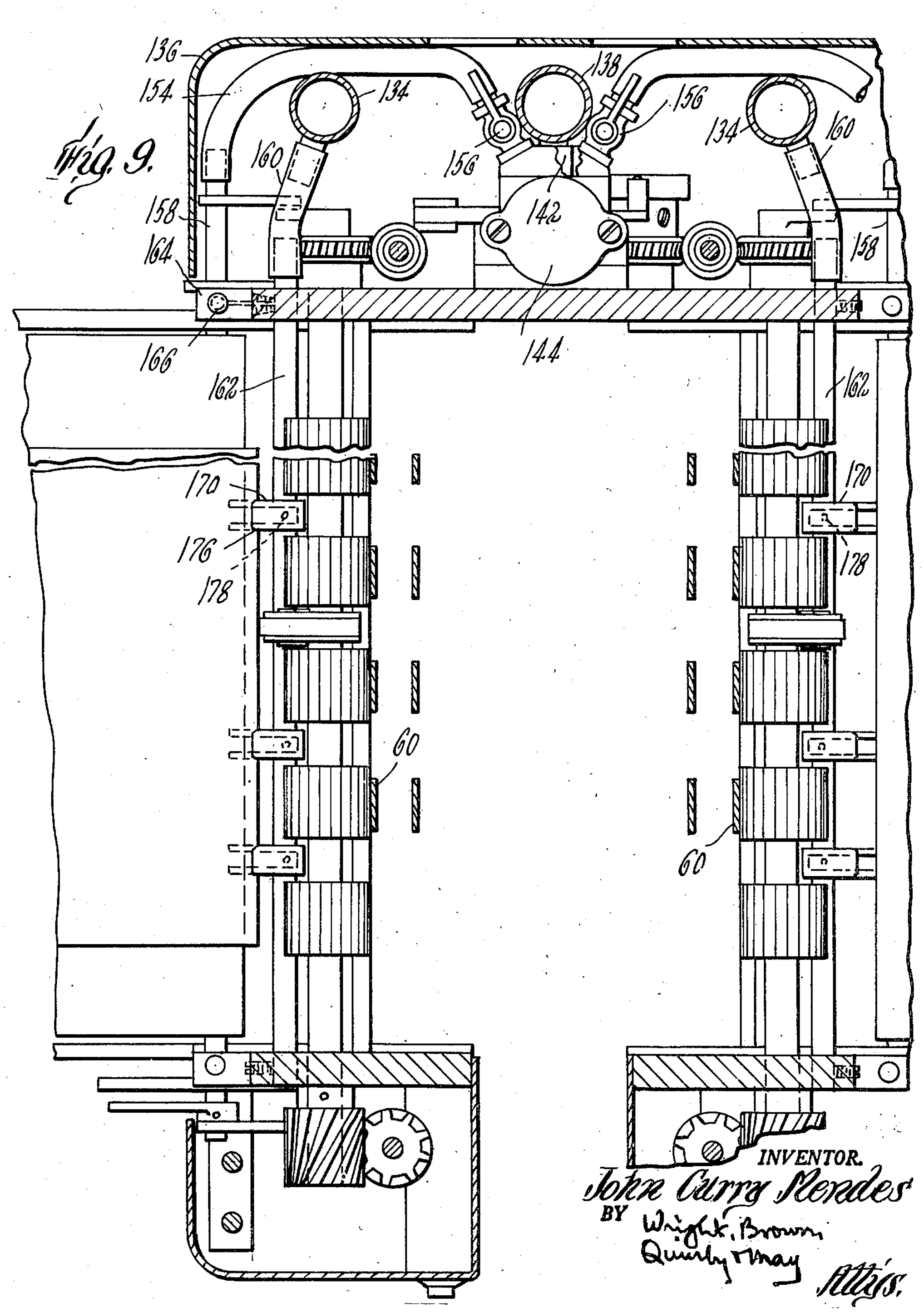
Figure 9 is a section on the line 9—9 of Figure 6, on a larger scale.
Figure 10:
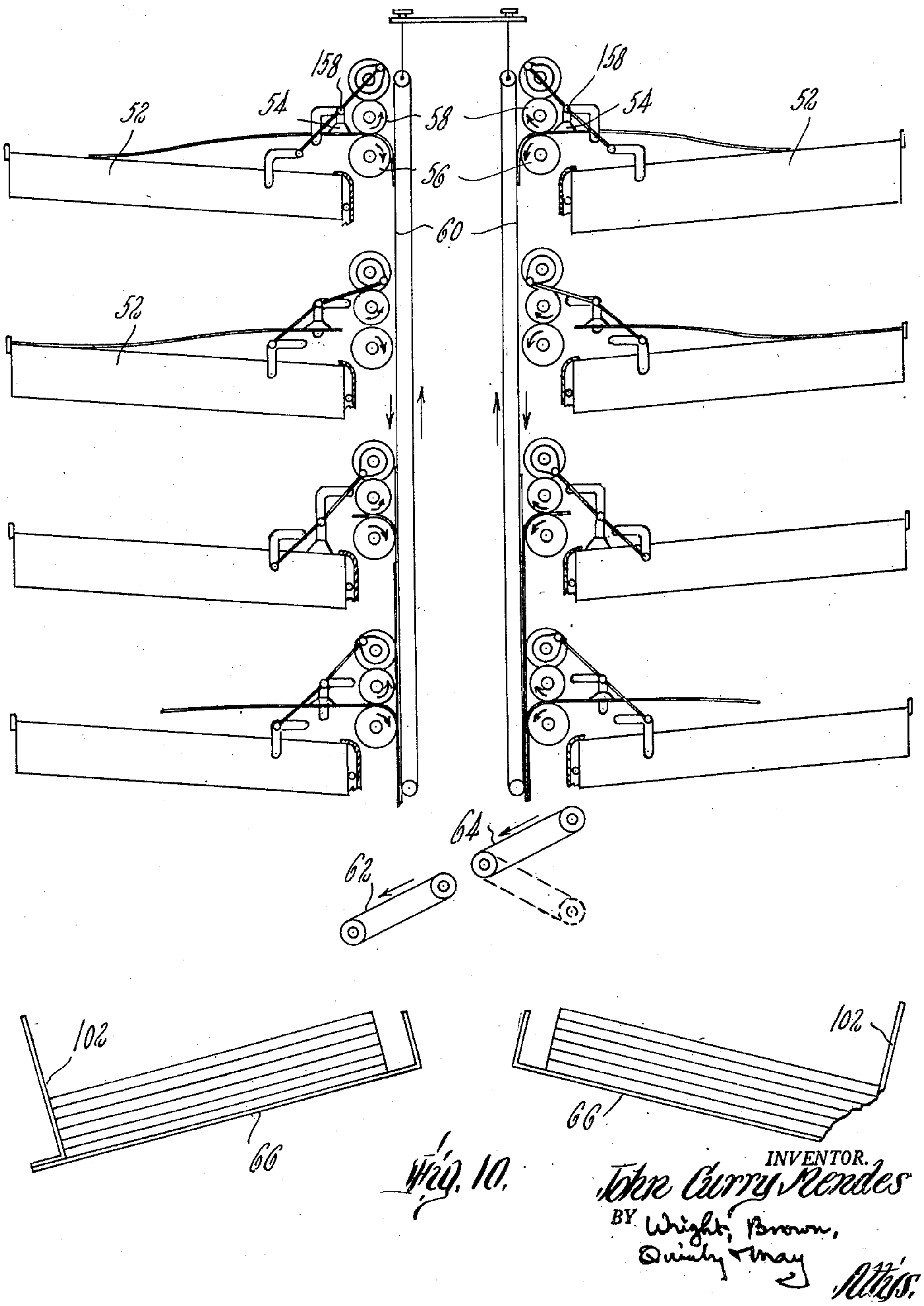
Figure 10 is a diagrammatic elevation illustrating the operation of the collating mechanism.

The machine as a whole is illustrated in Figure 1 and its operating function is illustrated in Figure 10. As shown, the machine comprises a cabinet 30 containing a motor 32 which drives a pump mechanism 34 for compressing air in a supply tank from which it is supplied to the machine through a pipe 38. A second motor 40 within the cabinet drives mechanism carried by a superstructure which comprises front and rear rectangular frame members 42 and 44 which are mounted on the cabinet 30 and are braced by a horizontal top member 46. The front frame member is preferably in two parts spaced by a central gap through which ready access is had to the interior of the superstructure. The front and rear frame members support two tiers of shelves or tables 50 which project out therefrom and are adapted to carry piles 52 of paper sheet from which individual sheets are taken by the machine and collected into groups, each such mechanism and its shelf being hereinafter referred to as a unit. In the machine illustrated on the drawings each tier has four units. As hereinafter described any of these units may be made inactive so that sheets can be withdrawn from one or more of the tables of each tier and sets of sheets from the two tiers may be collected in separate groups or may all be collected together into a single group of eight or less. Figure 10 shows diagrammatically the operation of the machine by which individual sheets of paper are seized and picked up from the top of the pile 52 by suction cups 54 and are delivered into the nip of knurled metal rolls 56 and rubber rolls 58 which, as shown in Figure 8, are longitudinally discontinuous, each of the rolls 56 having six spaced sections, each of the rolls 58 having two spaced sections. From these rolls the sheets are fed downward by vertical, downwardly moving stretches of endless guide belts 60 which touch the rolls 56 and are driven at a linear speed substantially equal to that of the rolls 56. The operation of the cups 54 in each tier is timed so that as a sheet from the uppermost pile reaches the level of the rolls in the next unit below, the sheet from the pile in that unit joins it. The two sheets are similarly joined by third and fourth sheets if all of the units of the tier are operating, so that a collected group of four sheets is deposited on a set of sloping conveyor belts 62. Sheets collected from the other tier are deposited on a set of sloping conveyor belts 64. The two groups are collected into one, if the conveyors 62 and 64 are arranged as indicated in Figure 10, and are discharged onto a receptacle 66. If the conveyor 64 is sloped the other way, the groups from the two tiers are discharged onto separate receptacles 66 and 68 (Figure 1). Stop mechanism, hereinafter described, is provided to stop the machine if the suction cups bring to the feed rolls either more than one sheet or no sheet at all.

Figure 2:
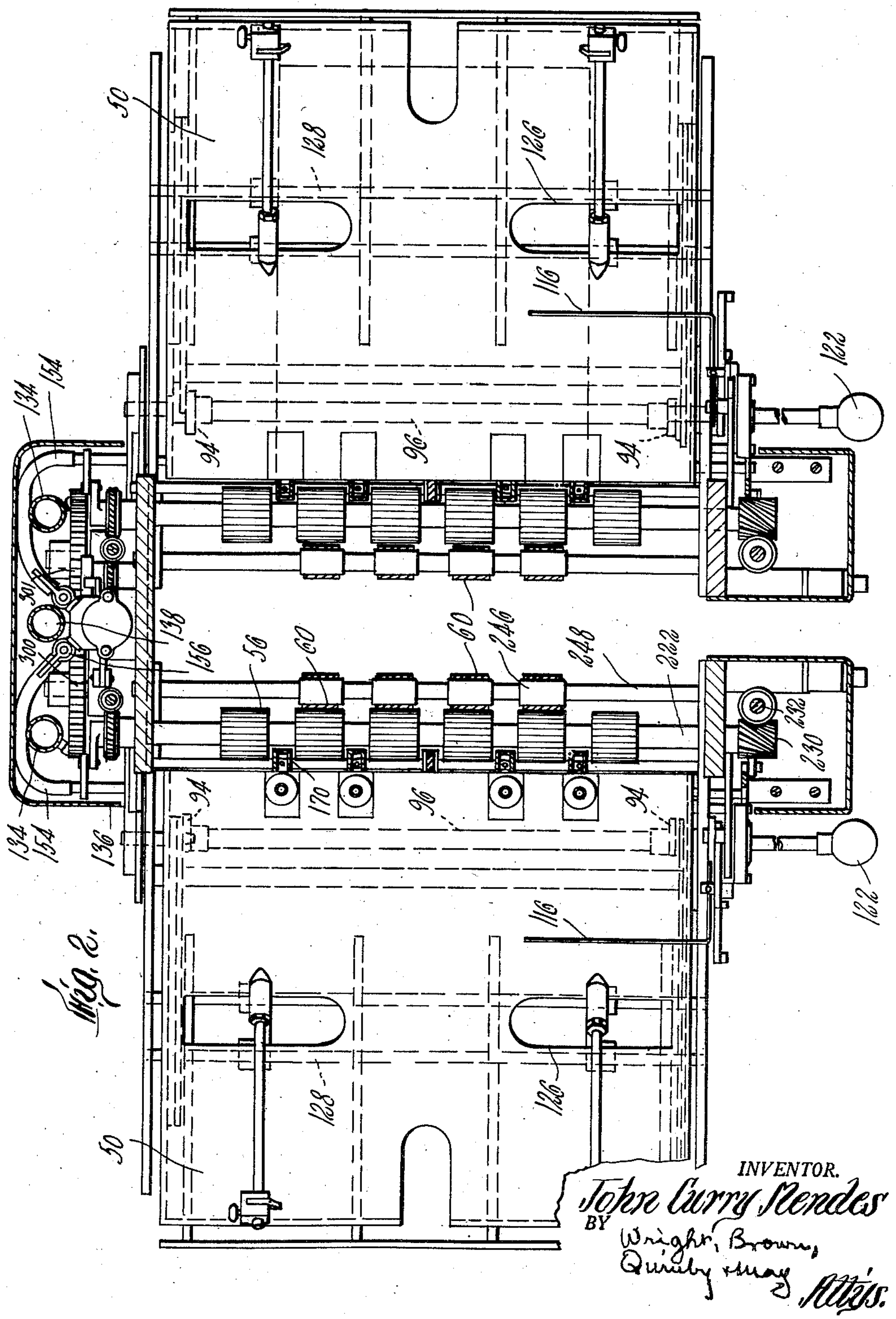
Figure 2 is a section on the line 2—2 of Figure 1, on a larger scale.
Figure 4:
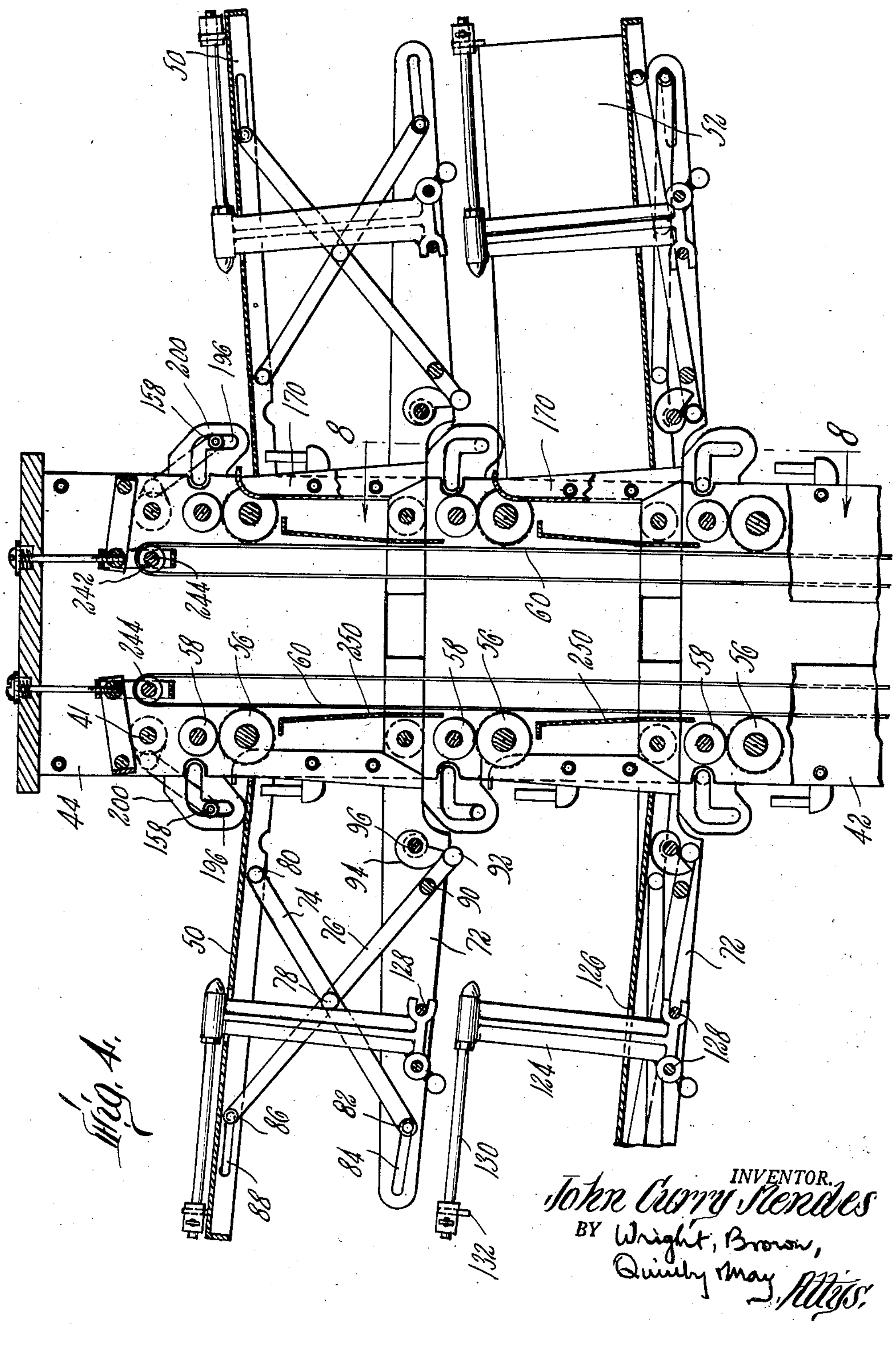
Figures 4 and 5 are together a front elevation of the operating part of the machine, parts being broken away to show structural details.
Figure 5:
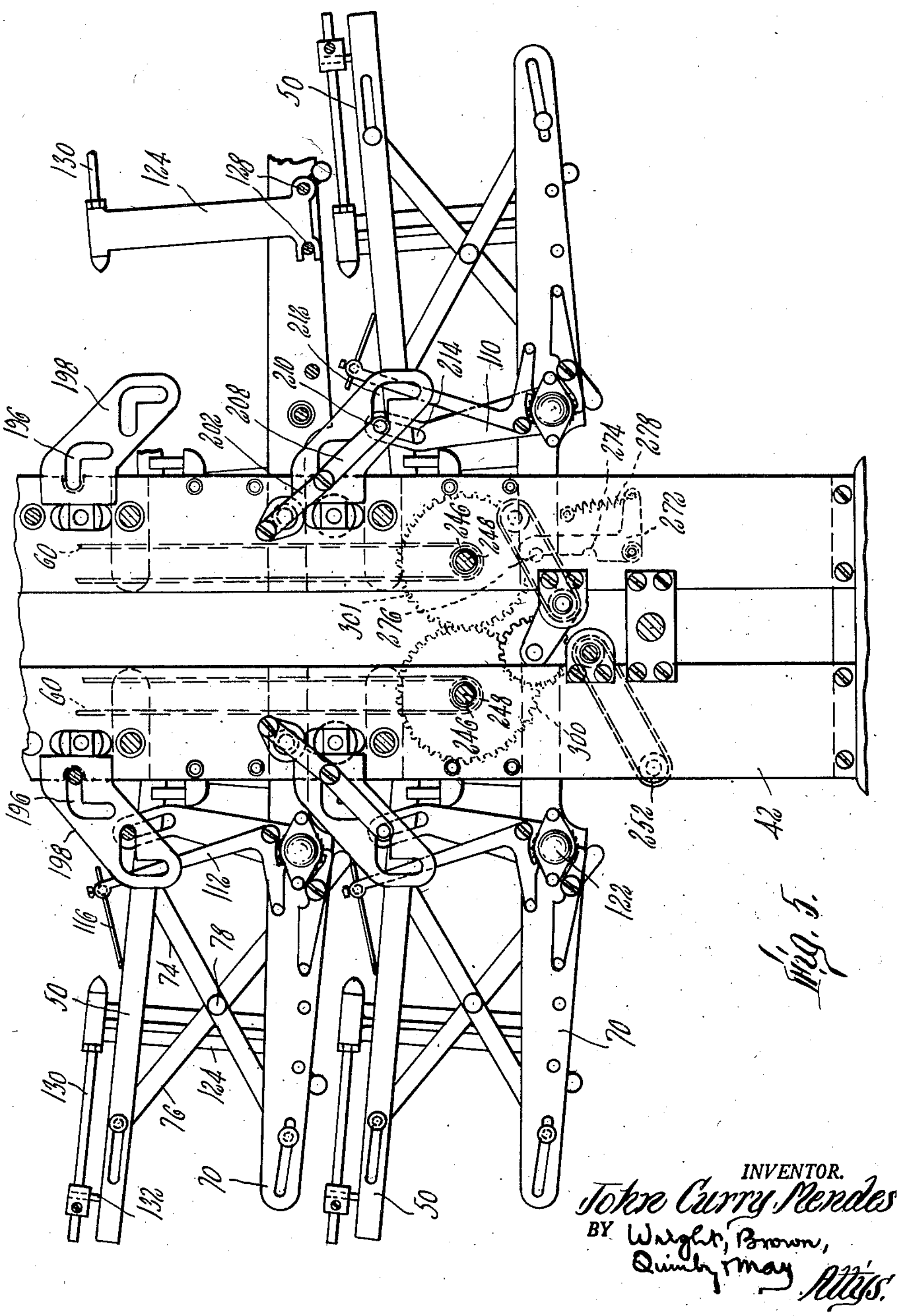

The tables 50 on which the piles 52 of paper rest are shown in Figures 2, 4 and 5. For the support of each table a pair of arms 70 and 72 project out horizontally from the front and rear frame members 42 and 44, respectively. Each side edge of a table 50 is connected to the arms 70 and 72 below it by crossed links 74 and 76 which are pivotally connected at 78, the point of their intersection. Each link 74 is pivotally attached at one end 80 to an edge flange of its table 50. The other end of the link 74 carries a lug 82 which slides in a slot 84 in an arm 70 or 72 when the table 50 moves up or down. The link 76 has a lug 86 at one end which slides in a slot 88 in an edge flange of the table and is pivoted at 90 near its other end to an arm 70 or 72. This other end of the link carries a cam follower 92 which bears against a spiral cam 94 mounted on a shaft 96, there being two such cams on each shaft 96. It is evident that rotation of these cams in the proper direction will elevate the corresponding table 50. Mechanism (Figures 11 and 12) is provided to raise the shelves gradually during the operation of the machine so as to maintain the top sheet of each pile 52 at a predetermined level with respect to the feed rolls 56 and 58 to which the top sheets are transferred by the suction cups. For this purpose a gear wheel 98 is mounted on the shaft 96 with one of the cams 94. This meshes with a pinion 100 which is secured to a gear wheel 102 idling on a shaft 104 which extends from a front arm 70 to the corresponding rear arm 72. The gear wheel 102 meshes with a pinion 106 which idles on the shaft 96 and is on a common hub with a ratchet wheel 108. An upstanding arm 110 is loosely mounted at its lower end on the shaft 96 and is oscillated by means hereinafter described in time with the movements of the suction cups 54. The arm 110 carries a bell-crank 112 pivotally attached thereto at 114 near the lower end thereof. At the upper end of the long arm of the bell-crank is an L-shaped feeler 116 (Figures 2 and 11) which is arranged to touch the top of the sheet pile 52 when the bell-crank oscillates with the arm 110. The short arm of the bell-crank is shaped to form a pawl 118 adapted to engage the teeth of the ratchet wheel 108 so as to rotate this wheel step-by-step in the direction to elevate the shelf 50. A pawl 120 is pivotally mounted on the arm 70 and engages the ratchet wheel to prevent backward motion. This is manually disengaged when the shelf is to be lowered. For quick lowering of the shelf, the shaft 96 is extended out in front and a suitable knob 122 is mounted thereon. When the arm 110 is rocked the bell-crank is rocked with it, moving the pawl 118 back and forth over some of the teeth of the ratchet wheel 108. As the top sheets of the pile 52 are removed, lowering the top surface of the pile, the feeler 116 allows the bell-crank to rock further so as to permit the pawl 118 to engage the ratchet wheel 108 on the return stroke, thus slightly elevating the shelf 50. If the top of the pile is too high, the pawl 118 will be held clear of the ratchet wheel 108.

To hold the sheet piles in place on the shelves a pair of vertical brackets 124 extend up through openings 126 in the shelf from supporting rods 128 which extend between the arms 70 and 72. From each bracket 124 an arm 130 extends outward to carry a small abutment element 132 adjustable to engage against the outer edge of the upper sheets of the pile to prevent outward displacement of such sheets. The brackets 124 are adjustable on the supporting rods 128 to accommodate sheet piles of various widths.

Cupping means including suction cups 54 are employed to lift the top sheets from the piles, and jets of compressed air used to separate the uppermost sheets so that only one sheet at a time will be removed. The pneumatic system for these purposes is illustrated in Figures 1, 2, 7, 8 and 9. Compressed air is delivered from the tank 36 through the pipe 38 in the cabinet 30 to two vertical pipes 134 in a housing 136 at the rear of the superstructure. A third vertical pipe 138 in the housing 136 is connected by a pipe 140 to the suction of the air pump 34 so as to supply low pressure for the operation of the suction cups 54. At each unit level the suction pipe 138 is connected by a short branch pipe 142 to a valve 144 having a stem 146 whch is operated by a lever 148. The end of the lever 148 has a cam follower 150 which bears on a rotating cam 152 (Figure 7) so that the valve is opened and closed with each rotation of the cam 152. Each valve 144 is connected with two flexible tubes 154 (Figure 9) each of which has a shut-off valve 156 to cut off units, if any, as are not to be included in the operation of the machine. Each tube 150 communicates with a horizontal pipe 158 which carries a number of suction cups 54, four such cups being indicated in Figure 2. These cups are operated to pick up the top sheets of the plies and advance them as hereinafter described.

From the pressure pipes 134 a branch connection 160 for each unit communicates with a horizontal pipe 162 (Figures 8 and 9) which extends between and is secured to the frame members 42 and 44. Each pipe 162 communicates through elbow fittings 164 with nozzles consisting of two short upright pipes 166 which are respectively mounted on the two frame members 42 and 44, adjacent to the inboard corners of the corresponding shelf 50. Each pipe 166 is closed at its upper end and is provided with a vertical slit 168 through which an air jet plays on the adjacent corners of the uppermost sheets of the pile 52, tending to separate these sheets so that when the top sheet is lifted, the next sheet will not cling to it. For the same purpose a series of vertical channels 170 (Figures 4, 8 and 15) are mounted on the pipe 162 and a lower pipe or rod 172 to hold the channels in position facing the inboard edge of the pile of sheets. The edges 174 of the channels against which the sheets bear are slightly inclined from the vertical so that as the pile is elevated, the sheets may advance gradually toward the feed rolls. The upper end of each channel is curved toward the pile and a lip 176 extends loosely over the adjacent margin of the top sheet. A vent 178 opens into each channel from the pipe 162 which carries it, so that an air stream flows upward in the channel and is directed against the leading edges of the sheets in the pile, tending to separate the uppermost sheets.

Figure 15:
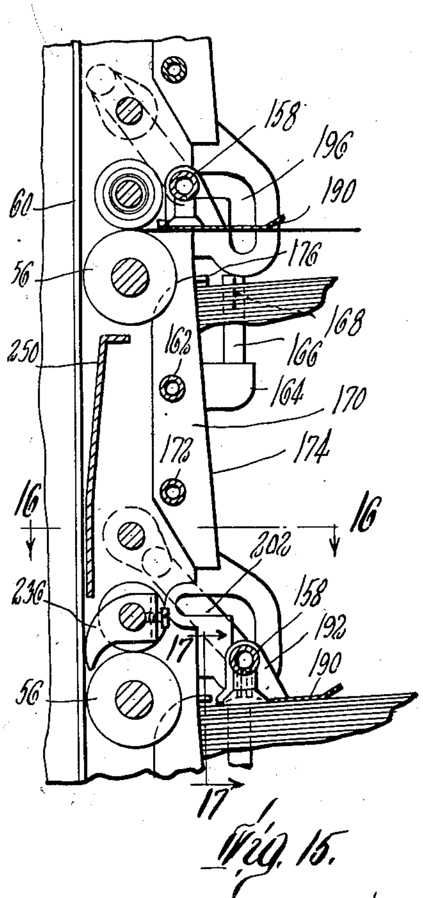
Figure 15 is a fragmentary section on the line 15—15 of Figure 8.
Figure 16:
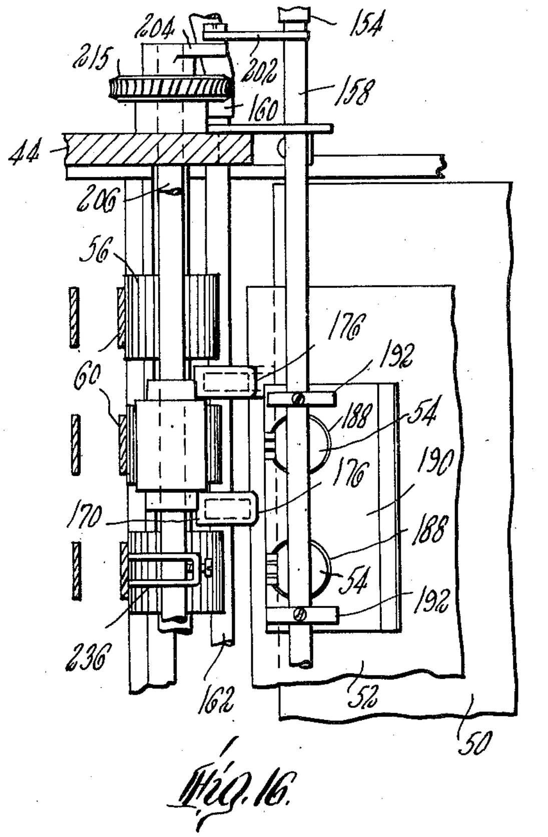
Figure 16 is a fragmentary section on the line 16—16 of Figure 15.
Figure 17:
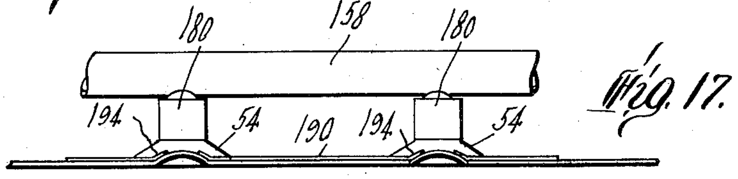
Figure 17 is a fragmentary section on the line 17—17 of Figure 15.
Figures 19, 20, 22, 23:
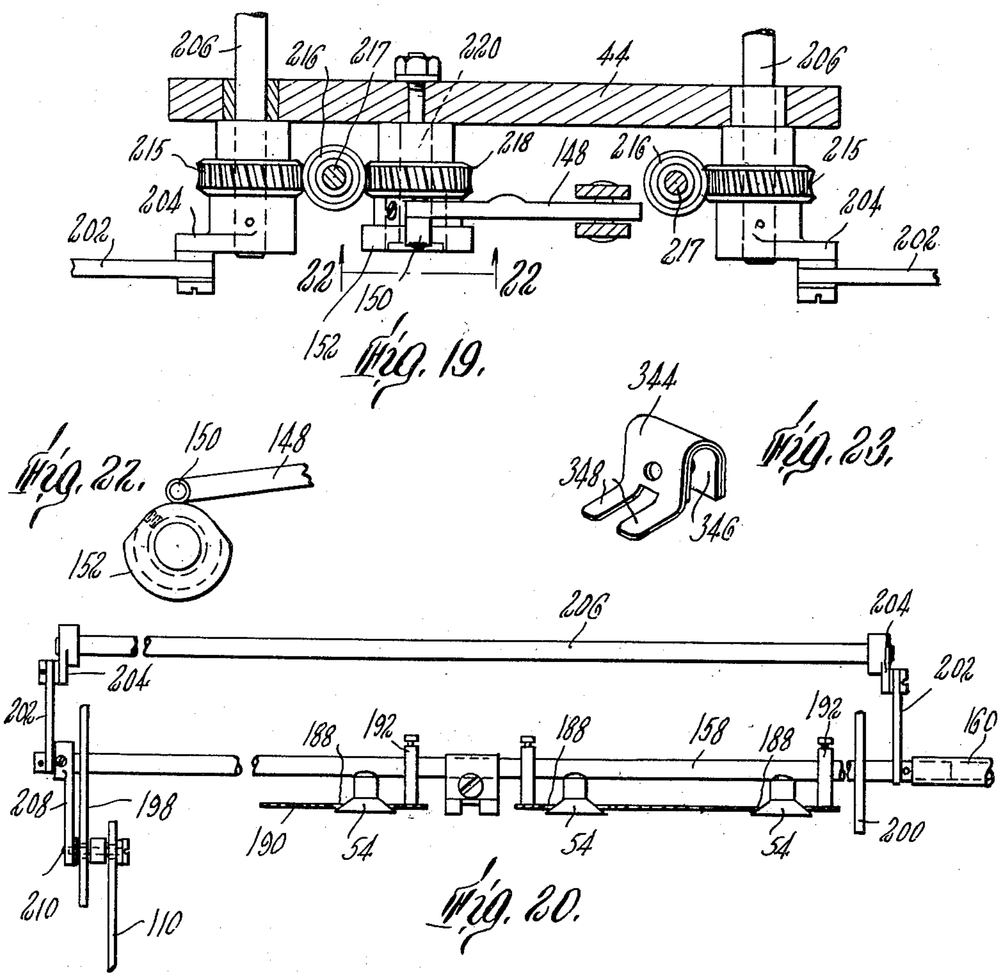
Figure 19 is a section on the line 19—19 of Figure 7, on a larger scale.
Figure 20 is a diagrammatic view of a paper feeding device.
Figure 22 is an elevation of a valve cam as viewed from the line 22—22 of Figure 19.
Figure 23 is a perspective view of a contact clip.

The suction cups 54 (Figures 15, 16 and 17) which lift the leading margins of the top sheets and present them to the feed rolls 56 and 58 are made of soft rubber or equivalent resilient material and are on connections 180 which extend down from the pipes 158. The lips of the cups of each unit are located in holes 188 in thin horizontal plates 190 which are supported by brackets 192 secured to the pipe 162 so that the lips of the cups are substantially flush with the bottom face of the plates. As shown in Figures 16, 17 and 20, there may be a plate 190 for each two cups 54. The holes 188 are near the inboard edge of each plate 190 and a slot is cut from each hole to the inboard edge, forming a pair of ears 194 which are slightly bent up as indicated in Figure 20. When the cup 54 and plates 190 of a unit move down with the supporting pipe 158 to engage a sheet, each plate as it approaches the top sheet forms a narrowing passage through which some of the air from the corner jets 166 and the channels 170 blows. The resulting venturi effect tends to lift the top sheet toward the approaching plate. Outward movement of the sheet is prevented by the abutment elements 132. When the downward movement of the cups and plates is completed, they bear on the top of the pile of sheets. The plates tend to level the top sheet so as to cause it to present a good surface to the cups. When the cups engage the top sheet, the corresponding valve 144 is opened to apply suction to the cups. When this occurs, the interrupted inboard margin of each plate 190 causes controlled distortion of the leading edge of the sheet, which in turn draws the sheet tight and facilitates the separation of the sheet from the one next below.

Figures 11, 12, 13, 14:
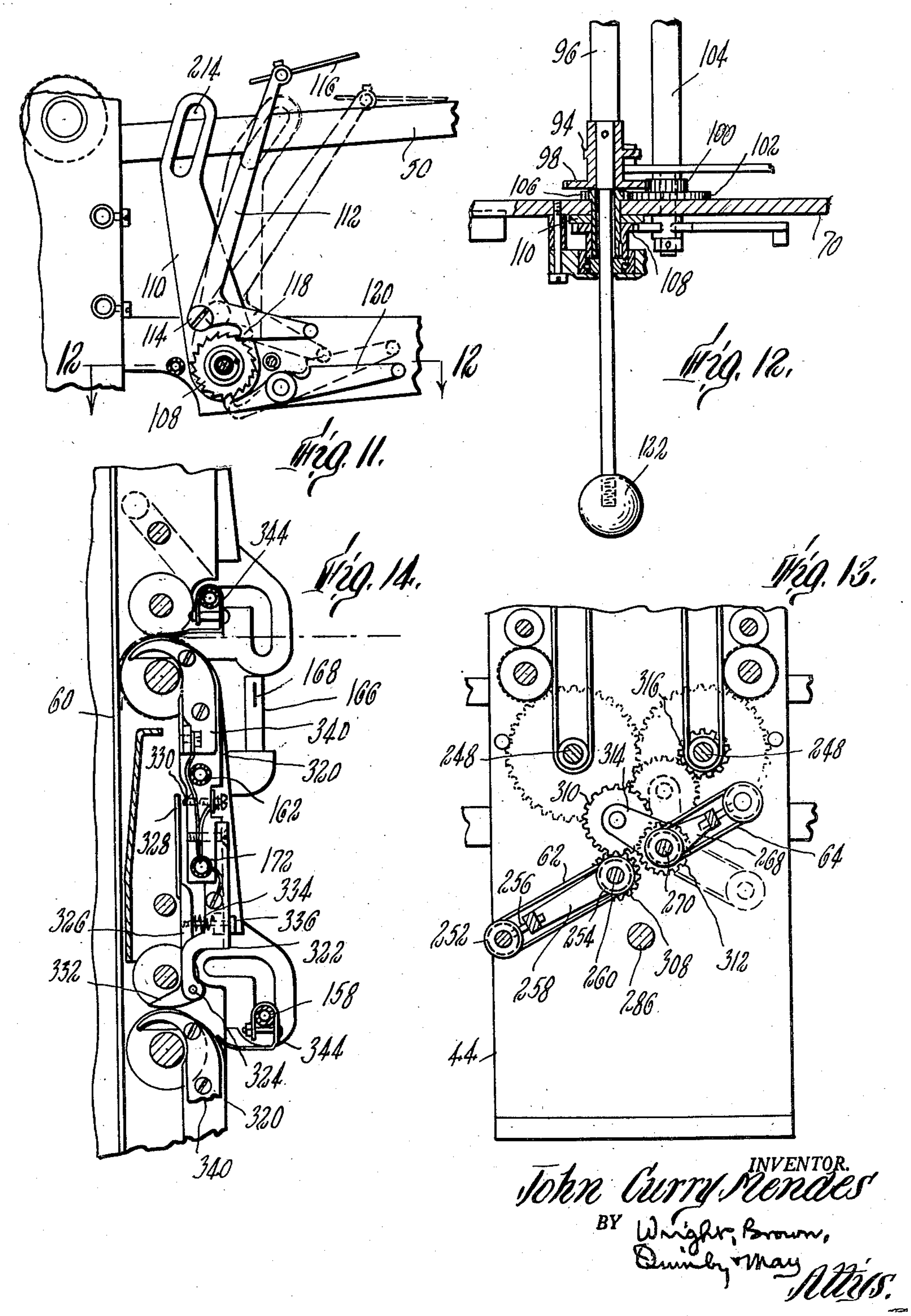
Figure 11 is a fragmentary detail of ratchet mechanism for lifting a shelf.
Figure 12 is a section on the line 12—12 of Figure 11.
Figure 13 is a fragmentary section on the line 13—13 of Figure 3.
Figure 14 is a fragmentary section on the line 14—14 of Figure 8.
Figure 21:
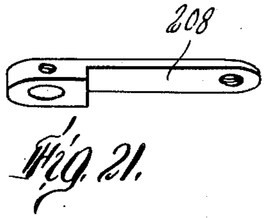
Figure 21 is a perspective view of one of the parts shown in Figure 20.

The motion of the cups when they have engaged a sheet is upward and then inward toward the rolls 56 and 58. The sheet is released by closing the valve 144 and breaking the suction and the cups return by retracing their movements to engage the next top sheet. Each of the pipes 158 which carry the cups is guided by L-shaped slots 196 in a bracket 198 projecting from the frame member 42 and a corresponding bracket 200 projecting from the frame 44 (Figures 4 and 5). Links 202 extend from each pipe 158 to cranks 204 mounted on a shaft 206 journalled in the frame members 42 and 44. As the shafts 206 rotate, the pipes 158 are moved back and forth from one of the L-slots 196 to the other. To prevent the pipes 158 from turning on their own axes, each has a link 208 (Figures 20 and 21) rigidly secured thereto, the other end of this link carrying a stud 210 which rides in a second L-shaped slot 212 in the bracket 198 and which also extends through a slot 214 in the corresponding arm 110 (Figures 5 and 11). Thus each arm 110 is rocked in synchronism with the movements of the suction cups of the same unit to maintain the top of the pile 52 of sheets at a substantially constant level.

Each shaft 206 has a worm gear 215 mounted thereon and meshing with a worm 216 (Figure 7). The worms in each tier of units are mounted on a common vertical shaft 217, these shafts being constantly driven by means hereinafter described. Also meshing with the worms 216 on one of the shafts 217 are worm gears 218 (Figures 7 and 19) each of which has a hub rotatable on a stub shaft 220 projecting from the frame member 44. Adjustably secured on the hub of each gear wheel 218 is a cam 152 which operates the valve 144 by which the suction in the cups 54 is controlled. Thus the suction is turned on and off in exactly timed relation to the movements of the cups 54.

Sheets which are lifted from the piles 52 by the suction cups 54 are presented to the nip of the rolls 56 and 58. The lower rolls 56 of each unit are mounted on a shaft 222 which is journalled in the frame members 42 and 44 and which is constantly driven. These rolls may be of metal with a milled cylindrical surface, or of any other suitable material. The upper rolls 58 are preferably surfaced with rubber and are rotatable on a floating shaft 224 which has end blocks 226 vertically movable in slots 228 in the frame members (Figures 6 and 8). The shafts 224 of the units of each tier are connected by spiral gears 230 to a vertical shaft 232 which rotates in bearings mounted on the frame member 42. The lowermost pair of shafts 222 are connected by spiral gears 234 (Figure 7) to the vertical shafts 217 so that the four vertical shafts 217 and 232 rotate in unison.

When the leading edge of a sheet passes between the rolls 56 and 58 it is deflected downward by one or more curved guides 236 (Figures 8, 15 and 16) which may be conveniently mounted on the shaft 224 so that the sheet engages the downward moving stretches of the endless belts 60 which extend around idle upper pulleys 242 on a shaft 244 and driven lower pulleys 246 on a shaft 248 (Figures 2, 4 and 5), there being a set of belts, pulleys and shafts for each of the two tiers of units. To prevent the sheet from curling away from the belts 60 a guide plate 250 is mounted under each set of rolls 56, these guide plates being substantially vertical and extending from one main frame member to the other (Figures 4, 8 and 15). The upper edge of each plate 250 is under or near one of the rolls 56. The lower edge of each plate 250 is between the adjacent belt 60 and the roll 58 of the unit next below, and is a little below the level of the top of the latter. The sheets descend vertically after passing between the rolls 56 and 58, the sheets from the uppermost units being joined by sheets fed from the successive lower units so that the collected sheets from the left hand tier (Figure 10) are deposited on the conveyor belts 62, those from the right-hand tier being deposited on the conveyor 64. The latter conveyor is adjustable to deflect the collected sheets to the conveyor 62 and on into the receptacle 66 or to deflect them to the right into the receptacle 68 (Figure 1). The belts 62 extend around idle pulleys 252 and driven pulleys 254. The idle pulleys are carried by brackets 256 projecting from a frame 258. The pulleys 252 are mounted on a driven shaft 260 journalled in the main frame members 42 and 44. The belts 64 pass around idle pulleys 262 and driven pulleys 264. The idle pulleys are carried by brackets 266 projecting from a frame 268. The pulleys 264 are mounted on a shaft 270 which is journalled in the main frame members. The belt frame 268 is rockable about the axis of the shaft 270 to change the direction of slope of the belts 64. To hold the frame 268 in one or the other of the positions indicated in Figures 10 and 13, a bell-crank 272 (Figures 3 and 5) is pivotally mounted on the inner face of the frame member 42 and is made with two notches 274 adapted to receive a pin 276 on the frame 268, a spring 278 being employed to press the arm of the bell-crank against the pin.

Figure 3:
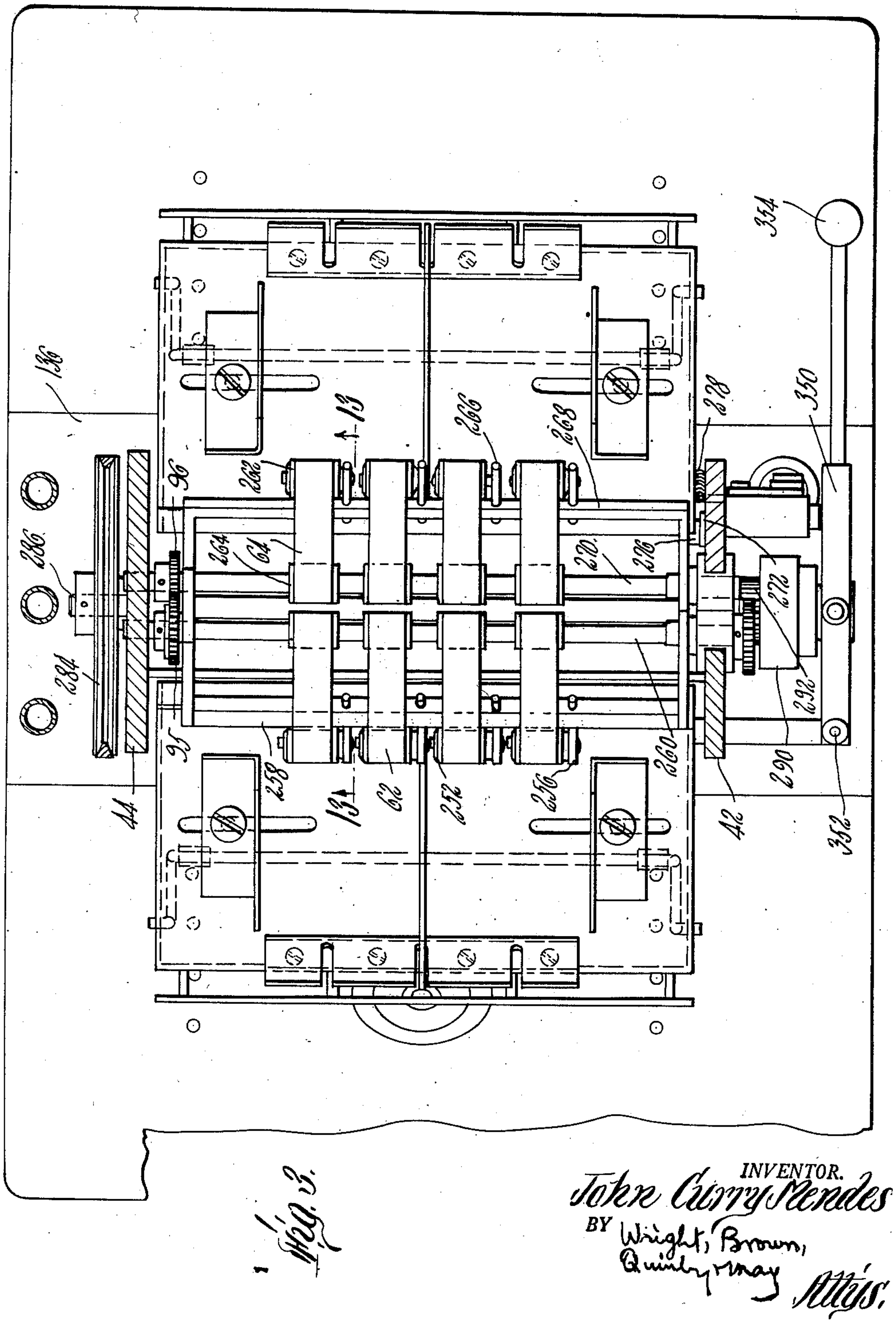
Figure 3 is a section on the line 3—3 of Figure 1, on the same scale as Figure 2.

The driving connections through which the motor 40 drives the various moving parts hereinbefore described comprises a belt 280 connecting a small pulley 282 on the shaft of the motor 40 to a large pulley 284 (Figures 1, 3 and 7). For regulation of the tension of the belt 280, the base of the motor 40 is hinged to the cabinet and is adjusted by manipulation of an exterior hand wheel 285. The pulley 284 is mounted on a shaft 286 which is journalled in the main frame members, the pulley 284 being in the housing 136 at the rear of the main frame. The shaft 286 projects out from the frame member 42 and is connected through a clutch 290 to a pinion 292 which meshes with a gear wheel 294 mounted on the shaft 260 which drives the conveyor belts 62. The gear wheel 294 is connected through a gear wheel 296 to a gear wheel 298 (Figure 6) mounted on one of the shafts 248. This shaft carries a gear wheel 300 which meshes with a similar gear wheel 302 (Figure 7) on the other shaft 248 so that the two shafts 248 rotate at equal speeds in opposite directions. The other shaft 248 has a gear wheel 304 similar to the wheel 298 but turning in the opposite direction. The gear wheels 298 and 304 mesh respectively with gear wheels 306 and 308 which are mounted on the two shafts 222. As hereinbefore stated, the shafts 222 are operatively connected to the four vertical shafts 217 and 232 (Figures 6 and 7).

The shaft 260 which drives the belts 62 carries a pinion 308 which is connected through an idle wheel 310 to a pinion 312 on the shaft 270 when the conveyor frame 268 is in the position shown in Figure 13. The shafts 260 and 270 then rotate in the same direction. The connecting gear wheel 310 is carried by an arm 314 which projects from the frame 268. When this frame is rocked to change the conveyor 64 to the position indicated in dotted lines in Figures 10 and 13, the gear wheel 310 remains meshed with the pinion 312 but moves clear of the pinion 308 and into meshing engagement with a pinion 316 on the right-hand shaft 248 shown in Figure 13. When thus connected, the shaft 270 rotates in a direction opposite to that of the shaft 260 so as to convey groups of sheets from the right-hand tier to the receptacle 68 (Figure 1).

Figure 24:
Figure 24 is a diagrammatic view showing the indexing of sheets.

If the groups of oblong sheets delivered to the receptacle 66 are to be separated later for individual treatment of each group, the group may be distinguished for ready separation by arranging one pile with the long axis of sheets oriented differently from the axes of the other piles. The relative arrangement of the sheets is diagrammatically illustrated in Figure 24, every eighth sheet being turned to facilitate subsequent separation of the sets.

Figure 25:
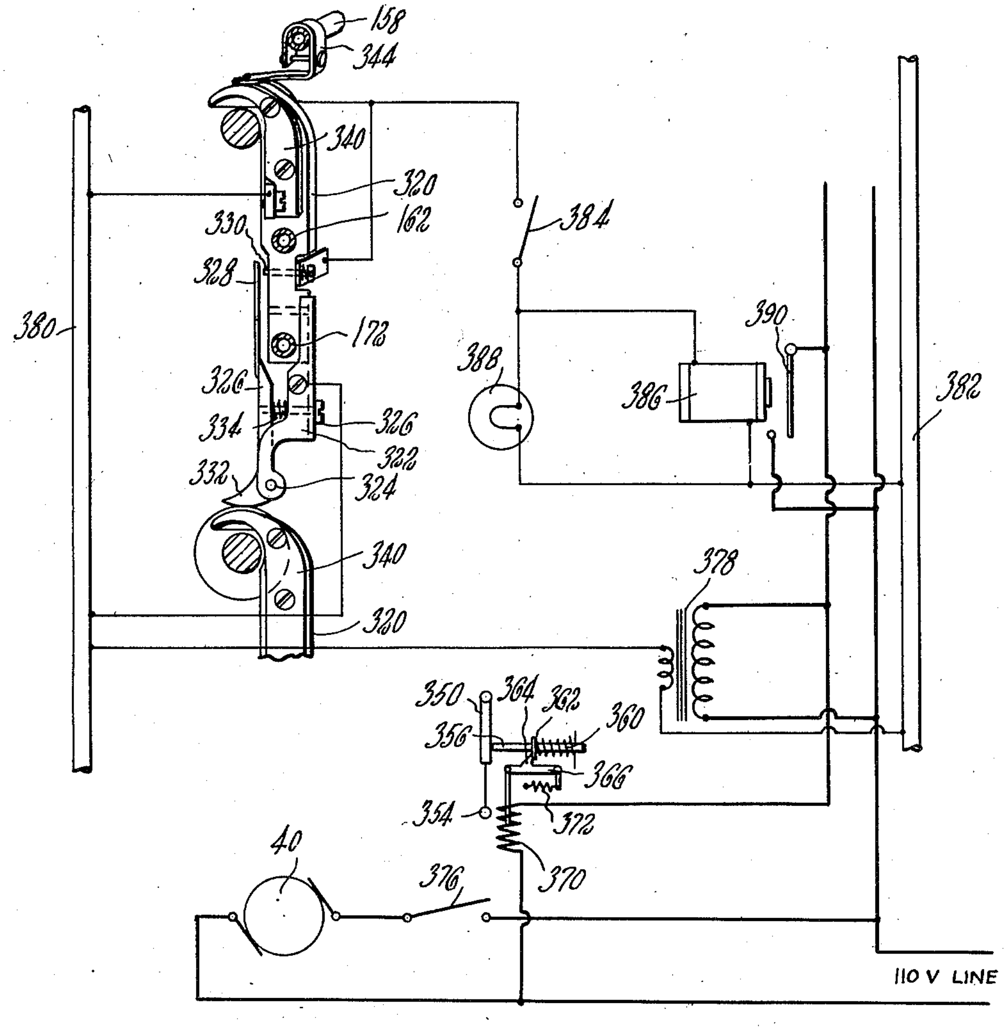
Figure 25 is a wiring diagram of control circuits.

Stop means are provided to stop the machine at once if in any operating unit the suction cups fail to bring up a sheet to the feed rolls 56 and 58, or if two or more sheets are brought up together. For this purpose a vertically elongated member 320 of electrical insulating material for each of the eight units is mounted on the pipes 162 and 172 (Figures 8, 14 and 25). Secured to the insulation member 320 and extending downward therefrom is a metal channel member 322 having bearings 324 at a lower end for rockably supporting a lever 326. The upper portion of this lever is elongated and carries at its upper end a switch element 328 which is movable by a slight rocking of the lever into contact with a switch element 330 extending through the insulator 320. The lower portion of the lever 326 is a narrow feeler which extends over the curved upper end portion of the insulator 320. A spring 334 is arranged to press the lever 326 tending to hold the switch elements 328 and 330 apart annd to move the feeler 332 down against the insulator 320 of the unit next below. The rocking of the lever in that direction, however, is limited by a screw 336 which passes loosely through the channel member 322 and is screw-threaded into the lever 326. The normal position of the lever is adjusted by turning this screw to space the feeler 332 from the insulator 320 below by a distance equal to the thickness of one sheet of paper in the pile 52. The switch element 330 is adjustable toward and from the element 328 and is set so that if two superposed sheets of paper are passed between the feeler 332 and the top of the insulator 320, the resultant rocking of the lever 326 clockwise is sufficient to move the element 328 into contact with the fixed element 330, closing a circuit which stops the machine as hereinafter described.

The upper portion of the insulator 320 is curved and is disposed between the central sections of the roll (Figure 8). The upper edge of this portion is shaped and arranged to lie in the cylinder defined by the surfaces of the roll sections 56 (Figure 14). On the two sides of this upper portion of the insulator are mounted electric terminals in the form of metal plates 340 and 342, the upper curved edges of which register with the curved edge of the insulator 320. A bridging conductor 344 (Figures 14, 23 and 25) is clamped onto the tube 158 which carries the suction cups 54 and is insulated therefrom by a liner 346. The conductor 344 is made with two spaced fingers 348 which straddle the top of the insulator 320 and are arranged to move into contact with the edges of the terminals 340 and 342 when the tube 158 lifts and advances the cups 54. If the cups lift a sheet of paper, the latter covers the edges of the plates before the conductor 344 arrives and thus insulates the conductor from the terminals. If the cups fail to lift a sheet of paper from the pile, the conductor electrically connects the terminals, closing a circuit which stops the machine.

Figure 18:
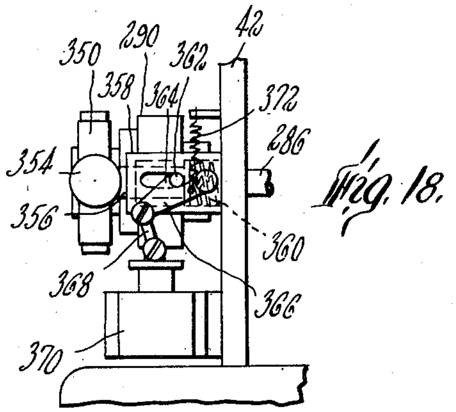
Figure 18 is an elevation of a clutch trip viewed from the line 18—18 of Figure 1.

The clutch 290 by which the driving motor 40 is operatively connected to all the moving parts of the superstructure has an operating lever 350 hinged at 352 and provided with a handle 354 by which the clutch can be manually closed (Figures 1, 3 and 18). A kickout mechanism is employed to throw out the clutch. This consists of a plunger 356 which projects from a housing 358 and bears against the lever 350. A strong spring 360 in the housing 358 is arranged to press the plunger toward the lever, but the plunger is normally prevented from pushing the lever by a pin 362 which projects laterally from the plunger through a slot in the housing and is caught on the nose 364 of a pivoted latch 366. A link 368 connects the latch to the armature of a solenoid 370 by the energization of which the latch 366 is rocked and the plunger 356 is released to throw out the clutch. When the fault which stopped the machine has been corrected, the clutch is manually closed by manipulation of the handle 354 and a spring 372 moves the latch to catch the plunger after its pin 362 has moved past the nose 364.

Wiring connections are shown in Figure 25. The motor 40 is connected through a master switch 376 to a suitable source of electric power. A parallel circuit goes through the solenoid 370 and the primary of a step-down transformer 378. The low-voltage secondary winding of the transformer is connected to bus-bars 380 and 382.

The plates 340 and the switch elements 328 of the eight units are connected to the bus-bar 380. The plates 342 and the switch elements 330 are connected through manually operable switches 384 and relays 386 to the bus-bar 382. The switches 384 are closed except when the machine is to operate with less than all the units. Also in series with each switch 384 is a telltale lamp 388 which lights up when a trouble circuit is made so as to indicate the unit in which the trouble has occurred. Energization of a relay magnet 386 closes a corresponding switch 390, energizing the solenoid 370 to trip the latch 366 and stop the machine.

I claim:

1. A collator for paper sheets, comprising a frame, an endless guide belt carried by said frame with a stretch of said belt extending vertically, means for driving said belt so that said stretch moves downward, a series of pairs of feed rolls arranged one over another adjacent to said stretch of belts, means for driving said rolls to feed single paper sheets endwise against said belt to be deflected downward thereby, a shelf mounted on said frame adjacent to each said pair of rolls, and adapted to hold a pile of paper sheets, cupping means operable to engage the top sheet of said piles and to advance said sheets to the corresponding feed rolls for feeding engagement thereby, and means periodically operating said cupping means.

2. A collator for paper sheets comprising a main frame, a tier of vertically spaced shelves for piles of paper supported by said frame, an endless guide belt supported by said frame adjacent to said tier of shelves, said guide belt presenting a vertical stretch toward said tier of shelves, means for drining said belt so that said stretch travels downward, means for picking up single sheets from said piles and feeding them endwise against said belt to be deflected vertically downward and guided in a vertical plane, and a receptacle arranged to receive said sheets from the belt.

3. A collator as set forth in claim 2, and means for maintaining the top of each pile of paper at a substantially constant level, said means comprising a feeler engaging the top of each pile, driven means for gradually elevating each shelf, and means controlled by each said feeler for disabling the corresponding elevating means except when the top of the pile is below the prescribed level.

4. A collator as in claim 2, common means for driving all said sheet pick-up means, and driving connections such that sheets from the several piles are presented to the guide belt in succession from the uppermost pile down, the operations being timed so that each sheet from the uppermost pile is joined in substantially face to face registration by sheets from the lower piles during its travel to said receptacle.

5. A collator for paper sheets comprising a main frame, two tiers of vertically spaced shelves for piles of paper supported by said frame, two endless guide belts supported by said frame between the tiers of shelves, each said guide belt presenting a vertical stretch toward a respective tier of shelves, means for driving said belts so that said stretches travel downward, means for removing the top sheet from said piles and feeding them against said belts to be deflected and guided vertically downward thereby, a receptacle under each said tier of shelves, a conveyer mounted on said frame and arranged to receive sheets from one of said belts and to transfer said sheets to the corresponding receptacle, a second conveyor mounted on said frame in a position to receive sheets from the other said belt, and means for adjusting said second conveyor to deliver the sheets received thereby to the first said conveyor or to the receptacle under its tier of shelves.

6. A collator for paper sheets comprising a main frame, a tier of vertically spaced shelves for piles of paper sheets mounted on said frame, a guide belt carried by said frame with a downwardly driven vertical stretch presented toward said shelves, a pair of feed rolls between said belt and each said shelf, the lower roll of each said pair touching said belt and rotating with substantially the same peripheral speed, and means associated with each said shelf for periodically picking up the topmost sheet from the pile on that shelf and transferring the leading edge of the sheet to said feed rolls.

7. A collator as in claim 6, and fixed guide elements carried by said frame between each pair of rolls and said belt, said guide elements being arranged to present downwardly curved surfaces to a sheet of paper passing between the rolls whereby to deflect the sheet downward as it approaches said belt.

8. A collator as in claim 6, and a substantially vertical guide plate beneath each said pair of feed rolls, each said plate extending downward near said belt to a level slightly below the top of the upper roll of the feed rolls next below.

9. A collator as in claim 6, each said pick-up means comprising a horizontal pipe movably supported by said frame over the inboard margin of the corresponding shelf, a horizontal plate rigidly attached to said pipe and adapted to be moved thereby down upon the topmost sheet of paper carried by said shelf, said plate having circular holes therethrough equally spaced from the inboard edges of the plate, a suction cup extending down from said pipe into each said hole, the rim of each said cup being substantially flush with the bottom of said plate, means for moving said pipe with its plate and cups upward and inward toward the feed rolls to transfer a sheet from the pile to the rolls and return, and means automatically applying suction to said cups through said pipe when the cnps are in contact with said pile and releasing said suction when the leading edge of the transferred sheet reaches the feed rolls.

10. Mechanism as in claim 9, each said plate having a cut from each said hole to the inboard edge of the plate, each said cut forming two opposed ears which are bent up slightly out of the plane of the plate.

References Cited in the file of this patent

UNITED STATES PATENTS

| | | |
|---|---|---|
| 1,223,398 | Kirkpatrick | Apr. 24, 1917 |
| 1,736,483 | Broadmeyer | Nov. 19, 1929 |
| 1,787,532 | Kelly | Jan. 6, 1931 |
| 2,260,540 | Schramm | Oct. 28, 1941 |
| 2,402,442 | Perry | June 18, 1946 |
| 2,479,060 | Davidson | Aug. 16, 1949 |
| 2,536,356 | Dager | Jan. 2, 1951 |
| 2,578,176 | Dager | Dec. 11, 1951 |
| 2,589,428 | Pearce | Mar. 18, 1952 |